United States Patent
Lange et al.

(10) Patent No.: US 10,742,100 B2
(45) Date of Patent: Aug. 11, 2020

(54) COIL SEGMENT FOR A STATOR COIL AND METHOD FOR MANUFACTURING A COIL

(71) Applicant: Dr. Ing. h.c. F. Porsche Aktiengesellschaft, Stuttgart (DE)

(72) Inventors: Johannes Lange, Wiernsheim (DE); Axel Heitmann, Ditzingen (DE); Tobias Engelhardt, Stuttgart (DE); Jan Nägelkrämer, Stuttgart (DE); Stefan Oechslen, Stuttgart (DE); Stefan Schmitz, Vaihingen/Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 192 days.

(21) Appl. No.: 15/896,522

(22) Filed: Feb. 14, 2018

(65) Prior Publication Data

US 2018/0233998 A1 Aug. 16, 2018

(30) Foreign Application Priority Data

Feb. 16, 2017 (DE) .......................... 10 2017 103 128

(51) Int. Cl.
*H02K 3/24* (2006.01)
*H02K 15/04* (2006.01)
*H02K 15/12* (2006.01)
*H02K 3/28* (2006.01)
(Continued)

(52) U.S. Cl.
CPC ........... *H02K 15/0421* (2013.01); *H02K 3/12* (2013.01); *H02K 3/24* (2013.01); *H02K 3/28* (2013.01); *H02K 15/0037* (2013.01); *H02K 15/0414* (2013.01); *H02K 15/12* (2013.01)

(58) Field of Classification Search
CPC .......... H02K 3/24; H02K 3/28; H02K 15/0421
USPC ....... 310/52, 54, 58, 64, 200, 201, 206, 207, 310/208; 29/596
See application file for complete search history.

(56) References Cited

U.S. PATENT DOCUMENTS

| | | | |
|---|---|---|---|
| 3,956,724 A | * | 5/1976 | Fagan, Jr. ................. H01F 6/06 335/216 |
| 9,887,596 B2 | | 2/2018 | Tamura |
| 10,164,490 B2 | | 12/2018 | Tsuiki et al. |

(Continued)

FOREIGN PATENT DOCUMENTS

| CN | 103795200 A | 5/2014 |
|---|---|---|
| CN | 105308832 A | 2/2016 |

(Continued)

OTHER PUBLICATIONS

Notification of Reason for Rejection for Japanese Application No. 2018-024695, dated Apr. 2, 2019, 5 pages.

(Continued)

*Primary Examiner* — Hanh N Nguyen
(74) *Attorney, Agent, or Firm* — RatnerPrestia

(57) ABSTRACT

A coil segment, in particular for a stator coil, wherein the coil segment has a conductor bundle, wherein the conductor bundle has a multiplicity of electrical conductors, wherein the conductor bundle has a form fit, wherein the conductor bundle has at least one cutout for feeding coolant. Furthermore, a method for manufacturing a stator coil, a stator coil having a coil segment according to the present invention, a machine having a stator coil according to the present invention, and a vehicle having a machine according to the present invention.

19 Claims, 9 Drawing Sheets

(51) Int. Cl.
*H02K 15/00* (2006.01)
*H02K 3/12* (2006.01)

(56) References Cited

U.S. PATENT DOCUMENTS

| | | | |
|---|---|---|---|
| 2002/0079773 A1* | 6/2002 | Butman | H02K 3/22 |
| | | | 310/201 |
| 2005/0012408 A1* | 1/2005 | Kim | H02K 3/24 |
| | | | 310/54 |
| 2005/0162025 A1* | 7/2005 | Sivasubramaniam | H02K 3/14 |
| | | | 310/64 |
| 2009/0026858 A1 | 1/2009 | Knauff | |
| 2014/0115876 A1 | 5/2014 | Okada et al. | |
| 2014/0300220 A1 | 10/2014 | Marvin | |

FOREIGN PATENT DOCUMENTS

| | | |
|---|---|---|
| CN | 105914913 A | 8/2016 |
| DE | 69827195 T2 | 3/2006 |
| EP | 0881749 B1 | 12/1998 |
| JP | 6059762 A | 4/1985 |
| JP | 08205441 A | 8/1996 |
| JP | 2007227262 S | 9/2007 |
| JP | 2010041795 A | 2/2010 |
| JP | 2012100433 A | 5/2012 |
| JP | 2014090613 A | 5/2014 |
| JP | 2014135240 A | 7/2014 |
| JP | 6024161 B2 | 11/2016 |
| JP | 6024162 B2 | 11/2016 |
| JP | 2017034848 A | 2/2017 |
| WO | 2015052964 A1 | 4/2015 |

OTHER PUBLICATIONS

Indian Examination Report for Indian Application No. 201814000926, dated Sep. 30, 2019, with translation, 7 pages.
Chinese Office Action for Chinese Application No. 201810133368.3, dated Aug. 21, 2019, 7 pages.
Chinese Office Action for Chinese Application No. 2018101333683, dated Mar. 20, 2020, 8 pages.

* cited by examiner

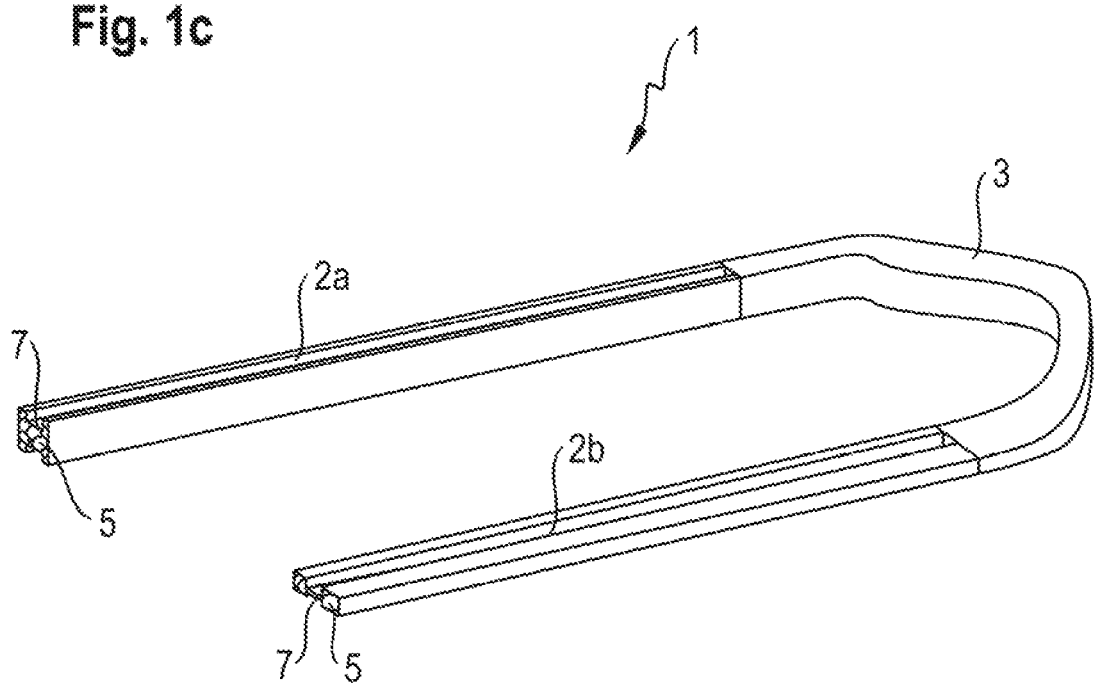

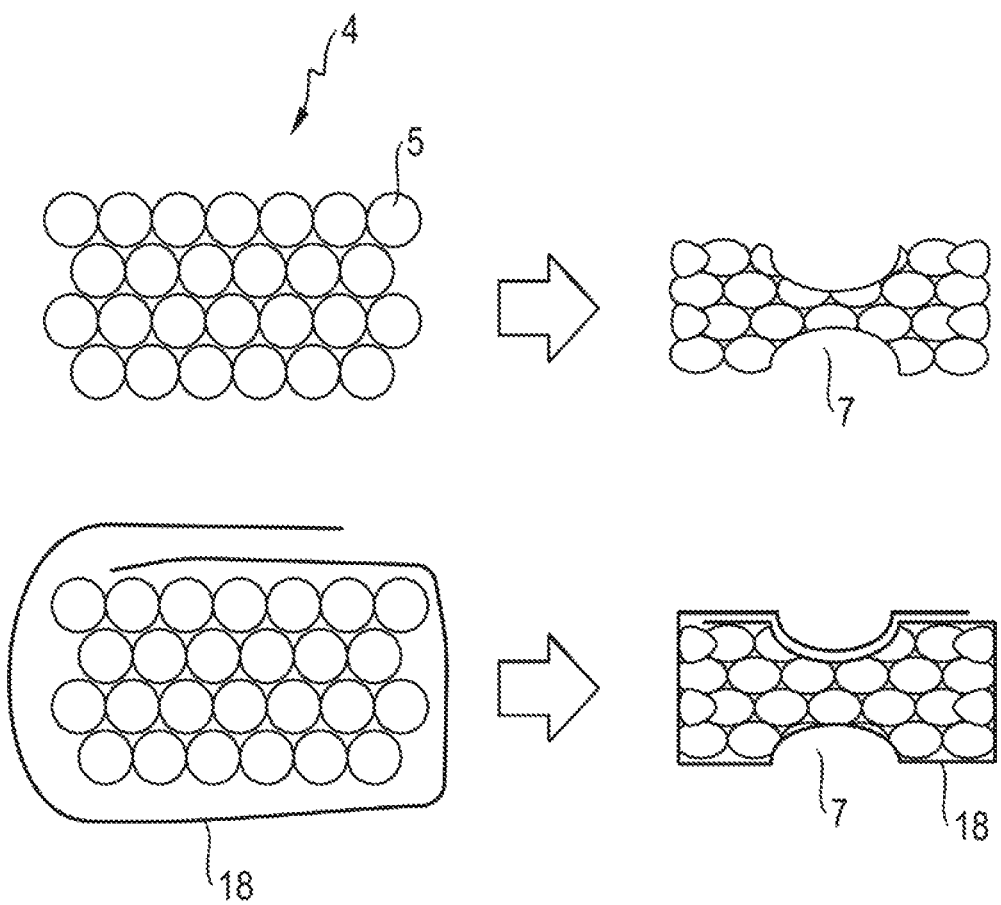

COIL SEGMENT FOR A STATOR COIL AND METHOD FOR MANUFACTURING A COIL

CROSS-REFERENCE TO RELATED APPLICATIONS

This application claims priority to German Patent Application No. DE 10 2017 103 128.6, filed Feb. 16, 2017, which is incorporated by reference herein in its entirety.

FIELD OF THE INVENTION

The present invention relates to a coil segment, in particular for a stator coil, wherein the coil segment has a conductor bundle, wherein the conductor bundle has a multiplicity of electrical conductors. The invention also relates to a corresponding stator coil.

BACKGROUND OF THE INVENTION

Stators in electric motors and generators are usually equipped with stator coils.

Various winding techniques for stator coils, including needle techniques flyer techniques, hairpin techniques or pulling-in techniques, are known from the prior art. In hairpin technology, the winding head of the stator coil is constructed from coil segments, referred to as hairpins. These are conductors which are bent in a U shape and have two open ends. The central partial region, that is to say the closed end of the conductor, is referred to as a head. In hairpin technology, in particular the bending of the conductor at the closed end, that is to say at the head of the hairpin, is demanding and costly in terms of fabrication technology.

The coil segments are inserted with their open end regions into the grooves of the stator core. The closed ends of the coil segments project beyond the stator core and form a coil end in the form of the winding head.

The stator is used in an electric machine. In particular, in electric machines for mobile applications, such as for example for motor vehicles, there is the need to make the electric machine, and therefore the stator and the stator coil, as compact as possible. On the other hand, electric machines have losses as a result of the generation of heat both in the electrical sheet metal of the stator and in the stator winding. Although these heat losses can be reduced by selection of the sheet metal and configuration of the winding, thermal energy still needs to be dissipated even with optimum configuration. In order to prevent the temperature of the stator of the electric machine not exceeding the limiting temperature of the materials used, it is necessary to provide the stator with a cooling means.

Air cooling systems are known from the prior art. However, especially given the compact design of the stator and therefore small cooling surface said cooling systems are not very efficient, and are insufficient for cooling electric machines with a high power density.

Furthermore, fluid cooling systems are known from the prior art which provide stator cooling by means of a cylindrical outer jacket or by means a cylindrical inner jacket of the stator. Alternatively, fluid cooling systems are known in which the cooling fluid is conducted in pipes which are provided in the stator sheet metal. However, the integration of the pipes requires increased sheet metal cross section and therefore a greater stator volume.

Document US 2014/0115876 A1, which is incorporated by reference herein, discloses a coil segment and a corresponding method for manufacturing a coil segment, which method permits the volume of the stator to be reduced. For this purpose, a conductor bundle is firstly rotated in such a way that the individual conductors of the conductor bundle remain movable in a sliding fashion with respect to one another, are then pre-shaped and finally compressed by means of a compression molding method to form an essentially U-shaped coil segment. As a result of the rotation of the conductors, wherein the conductors remain movable in a sliding fashion with respect to one another, a conductor bundle is made available whose head has a comparatively small curvature radius. As a result, the part of the coil segment which projects out during the winding over the stator core, is reduced and therefore a stator with a comparatively small volume is made available.

A disadvantage of this invention is that although it permits a comparatively compact design of the stator, it does not provide a solution for efficient cooling of the stator in a way which saves installation space.

SUMMARY OF THE INVENTION

The object of the present invention is therefore to make available a coil segment which permits a compact design of a stator and efficient cooling of the stator in a way which saves installation space.

This object is achieved by means of a coil segment, in particular for a stator coil, wherein the coil segment has a conductor bundle, wherein the conductor bundle has a multiplicity of electrical conductors, wherein the conductor bundle has a form fit, wherein the conductor bundle has at least one cutout for feeding coolant.

The coil segment according to aspects of the invention has, in contrast with the prior art, the advantage that it permits an installation-space-saving design of a stator with efficient cooling.

Advantageous refinements and developments of the invention can be found in the dependent claims and the description with reference to the drawings.

The electrical conductor can be embodied as a rigid electrical conductor or as a flexible electrical conductor. The flexible electrical conductor is preferably embodied from round wires, also referred to as stranded conductors. A stranded conductor according to the present invention denotes an electrical conductor which is composed of individual wires. The individual wires are preferably thin and prefabricated from copper. The conductor is also referred to below as a stranded conductor hairpin.

In one preferred embodiment of the present invention, the conductor bundle is pressed into a specific shape. For example, the conductor bundle can be compressed essentially into a U shape and have two essentially straight end regions and one bent central region which is formed between the two end regions. The central region is preferably shaped in such a way that compact winding of the stator core with the coil segment is possible. This makes it advantageously possible to make available a stator with a high filling factor.

In one preferred embodiment, the two end regions and the central region, formed between the end regions, lie in a plane, the main plane of the conductor bundle. In an alternative embodiment, a first end region lies in the main plane of the conductor bundle, and a second end region lies in a parallel plane, spaced apart from the main plane. In particular, the central region is shaped in such a way that the two end regions are spaced apart from one another in two directions which are perpendicular with respect to one another, i.e. the conductor bundle has in each case at least one curvature at the junction between the two end regions and the central region.

The conductor bundle preferably has, on the one side, a cutout for feeding coolant. In one preferred embodiment, the conductor bundle has, on the side lying opposite the one side, a second cutout for feeding coolant. For example, the conductor bundle has a cutout on each of the sides parallel to the main plane. In one alternative embodiment, the conductor bundle additionally has a further cutout for feeding coolant on at least one side which is perpendicular with respect to the main claim of the conductor bundle.

In a further preferred embodiment of the present invention, the conductor bundle has insulation.

Insulation is composed of an insulating material, for example plastic. The insulating material, is preferably resistant to a coolant. The insulation can surround the conductor bundle coaxially, at least along a longitudinal section of the conductor bundle. Alternatively, the insulation can surround the conductor bundle coaxially along the complete length of the conductor bundle.

In a further preferred embodiment of the present invention, the conductor bundle ha rectangular cross section in at least one end region. In an alternative preferred embodiment of the present invention, the conductor bundle has a non-rectangular cross section in at least one end region.

The non-rectangular cross section is preferably an annular segment. In an alternative preferred embodiment, the non-rectangular cross section is a trapezium. The trapezium is preferably an equilateral symmetrical trapezium. Other cross sections such as for example, circles, circular segments and polygons are also conceivable.

As a result it is advantageously possible to make available a coil segment which is adapted to the cross section of the stator groove. In particular, this makes available a coil segment which fills the groove cross section to an optimum degree. As a result, winding of a coil, in particular of a stator coil, with an increased filling factor is possible.

Both end regions preferably have a rectangular cross section or both end regions preferably have a non-rectangular cross section. The cross section of the first end region has, for example, the same dimensions as the cross section of the second end region.

In one further preferred embodiment of the present invention, a first end region of the conductor bundle has a first geometry, and a second end region has a second geometry, which is different from the first.

For example, a first end region of the conductor bundle has a rectangular cross section with a first width and a first height, and a second end region of the conductor bundle has a rectangular cross section with a second width and a second height. However, it is also conceivable that the first height corresponds to the second height.

In an alternative preferred embodiment, a first end region of the conductor bundle has a non-rectangular cross section with first dimensions, and a second end region of the conductor bundle has a non-rectangular cross section with second dimensions. In particular, the first end region can have a cross section in the form of an annular segment with a first inner radius and a first outer radius and a first angle. The second end region can have a cross section in the form of an annular segment with a second inner radius, a second outer radius and a second angle. The difference between the first inner radius and outer radius preferably corresponds to the difference between the second inner radius and outer radius. In one preferred embodiment, the first inner radius corresponds essentially to the second outer radius. The first angle preferably corresponds to the second angle. In an alternative embodiment, the first and the second end regions have a trapezoidal cross section, wherein the trapezium is equilateral and symmetrical. In this context, the trapezoidal cross section of the first end region preferably has a first height, and the trapezoidal cross section of the second end region a second height which corresponds to the first. In this context, the widths of the cross sections are selected such that the cross section of the first and the cross section of the second end region form a trapezium if they are laid one on top of the other with the parallel sides.

It is also conceivable for a first end region to have a rectangular cross section and a second end region to have a non-rectangular cross section.

As a result of the different geometry of the two end regions of the conductor bundle, an asymmetric coil segment is made available. This permits optimum adaptation of the coil segment to the stator design. In particular, when the stator is wound with first end regions in a first layer and second end regions in a second layer a non-rectangular cross section of the stator groove can be taken into account.

In an alternative preferred embodiment of the present invention, a first end region of the conductor bundle has a first geometry, and a second end region has a second geometry, which corresponds to the first.

In a further preferred embodiment of the present invention, the electrical conductors each have insulation. As a result of the insulation of the conductors with respect to one another, undesired currents between the conductors are advantageously avoided.

In one preferred embodiment, the conductor bundle has a multiplicity of stranded conductors or round wires which are insulated with respect to one another.

A further subject matter of the present invention is a stator coil, wherein the stator coil has a plurality of coil segments as claimed in one of claims 1-6, wherein the stator coil also has a stator core, and wherein the stator core has a multiplicity of grooves for receiving the end regions of the coil segments, wherein at least two end regions are arranged facing one another in the grooves in such a way that two cutouts of the coil segments form a cooling duct.

By this means it is advantageously possible to make available a stator coil, which permits efficient cooling of the stator with simultaneously low overall volume. It is advantageously possible by this means to operate an electric machine at relatively high rotational speeds and with relatively high power density without exceeding temperature limiting values of the materials involved. By this means, an electric machine which is more powerful compared to the prior art is made possible.

The stator core is preferably essentially in the shape of a cylinder. The stator core is preferably composed of a layered laminated coil, wherein the individual laminations are preferably insulated with respect to one another. As a result, eddy currents are advantageously suppressed. The coil segments are introduced with their end regions into the grooves of the stator core. In this context, each groove preferably has at least two end regions. The end regions can be arranged one on top of the other in the radial direction within the groove. Alternatively, the end regions are preferably arranged one on top of the other within the groove, in a direction which is perpendicular with respect to the cylinder axis. In this context, the end regions form at least a first and a second layer. The two end regions of a coil segment are preferably arranged in two different grooves, with the result that an end region of a first coil segment comes to rest on an end region of a second coil segment within a groove.

The two end regions which are located within a groove are preferably arranged one above the other in such a way that the cutouts which are located at least at the end regions form a duct within the groove. This duct is suitable for conducting coolant. The cutouts preferably run parallel with respect to the cylinder axis of the stator core, with the result that at least one coolant duct which runs parallel with respect to the cylinder axis in the stator is produced within the groove.

In a further preferred embodiment of the present invention, at least one groove has a cross section with a varying width, wherein at least one end region with a first geometry, and at least one end region with a second geometry are arranged in the at least one groove in such a way that the groove cross section is filled to an optimum degree by the at least two end regions.

The cross section of the stator groove depends on the electric machine in which the stator is installed. The stator groove usually has an essentially rectangular cross section, wherein the sides of the cross section which point in the radial direction are shorter than the sides which run perpendicularly with respect thereto. That is to say the width of the cross section of the stator groove is smaller than the length of the cross section of the stator groove. However, it is also conceivable for the cross section to have a larger width than its length. The end regions form at least a first and a second layer in the groove, wherein the end region of the first layer preferably has a first geometry, and the end region of the second layer a second geometry.

In one alternative embodiment, the stator groove has an essentially symmetrical, equilateral, trapezoidal cross section, i.e. the width of the groove increases radially outward. Alternatively it is conceivable for the width of the groove to decrease radially outward.

For example, the end regions which are arranged in the groove with a radially outwardly increasing trapezoidal cross section have a symmetrical, equilateral, trapezoidal cross section. Optimum filling of the cross-sectional area of the groove by the coil segments arranged therein is achieved, for example, by virtue of the fact that the cross sections of the end regions have the same trapezoidal angle as the groove cross section, and the end regions of the first layer have a smaller cross-sectional width than the end regions of the second layer.

Alternatively, the end regions which are arranged in the groove with a trapezoidal cross section have a cross section in the form of an annular segment, wherein the end regions of the first layer have a smaller cross-sectional width than the end regions of the second layer.

According to the present invention, more than two layers of end regions can also be mounted in a groove, wherein the geometries of at least two end regions differ from one another. In this context, the two end regions with different geometries can be associated with one coil segment, and the stator core can therefore be fitted with asymmetrical coil segments. Alternatively, the stator core can be fitted with symmetrical coil segments of a different design, wherein the coil segments of the first design have end regions with a first geometry, and the coil segments of the second design have end regions with a second geometry.

In a further preferred embodiment of the present invention, the at least one groove has a cross section with a region with a first width and with a region with a second width, which is different from the first width, and wherein at least one first region with a width which corresponds to the first width and at least a second region with a width which corresponds to the second width are arranged in the at least one groove in such a way that the groove cross section is filled to an optimum degree by the at least two end regions.

According to the present invention, the at least one groove is embodied essentially in a T shape. In this context, the region with a relatively small width is arranged radially on the inside, and the region with a relatively large width is arranged radially on the outside. At least one end region with a width which corresponds essentially to the relatively small width is arranged in the region with a relatively small width. At least one end region with a width which corresponds essentially to the relatively large width is arranged in the region with a relatively large width. For example, the region with a relatively small width can have two layers of end regions which correspond essentially to the relatively small width. For example, the region with a relatively large width can have two layers of end regions with a width which corresponds essentially to the relatively large width. This design can be transferred to any desired number of layers. In this context, the end regions can have rectangular or non-rectangular cross sections.

In one preferred embodiment, the stator core has two designs of coil segments, wherein the coil segments of the first design have end regions with a first cross-sectional geometry, and wherein the coil segments of the second design have end regions with a second cross-sectional geometry which is different from the first.

In an alternative embodiment, the stator core has one design of coil segments, wherein the coil segments each have an end region with a first geometry and an end region with a second geometry which is different from the first. The stator core is therefore fitted with asymmetrical coil segments.

A further subject matter of the present invention is a method for manufacturing a coil segment according to one of claims 1-5, wherein in a first step a multiplicity of electrical conductors are combined to form a conductor bundle, and wherein in a second step the conductor bundle is shaped by means of a compressive molding method, wherein the conductor bundle has at least one cutout for feeding coolant.

By this means, a simple and cost-effective manufacturing method is advantageously made available for a coil segment. In particular, the entire coil segment is advantageously compressed into the required shape, with the result that the cost-intensive and costly bending of the central part or head of the coil segment is dispensed with. Furthermore, a coil segment for simple and cost-effective manufacture of a stator with efficient cooling which is optimized in terms of the installation space is made available by the method according to aspects of the invention. A simple and cost-effective method is advantageously made available which permits the manufacture of a coil segment which is adapted in its geometry to the groove geometry.

The electrical conductor can be combined in an unordered fashion to form a conductor bundle. The electrical conductors are advantageously combined rotated slightly with respect to one another, with the result that the conductor bundle cannot fall apart before the compression molding. Furthermore, the twisting reduces or suppresses current displacement effects and/or groove field displacement effects.

The compression molding is carried out by means of a compression molding device, having a mold and a die, wherein the mold has a negative relief in the form of the coil segment to be manufactured, and the die has a corresponding positive relief. In this context, the negative relief of the mold has at least one protrusion. In one preferred embodiment, the positive relief also has at least one corresponding protrusion. In this context, the conductor bundle is placed in the negative relief of the mold and is compressed into the predefined shape by means of the die. The protrusions of the mold and/or of the die provide here the coil segment with one or two cutouts for feeding coolant.

In one preferred embodiment of the present invention, the conductor bundle is baked and/or welded during the compression molding method.

As a result, the mechanical stability of the coil segment is advantageously increased without a further process step being necessary. By this means, an efficient and time-saving method for manufacturing a stable coil segment, constructed from a conductor bundle, is advantageously made available.

In an alternative preferred embodiment of the present invention the conductor bundle is baked and/or welded in a third step after the compression molding method.

As a result, in a third process step the mechanical stability of the coil segment is increased. The process conditions for the process of the baking or welding can be optimized by the separate process step. For example, the baking and/or welding can take place in a device which is separate from the compression molding device.

In a further preferred embodiment of the present invention, the conductor bundle is provided with insulation.

An insulating material is preferably placed around the conductor bundle before the compression molding, and compressed along with it in the compression molding step. Alternatively, after the compression molding and, if appropriate, after the baking and/or welding, the conductor bundle is provided with an insulating material jacket.

In a further preferred embodiment of the present invention, the two end regions of the conductor bundle are shortened to a specified length.

In one preferred embodiment of the present invention, the shortening of the end regions of the conductor bundle takes place during the compression molding step. In one alternative embodiment of the present invention, the cutting of the end regions of the conductor bundle to length takes place after the compression molding step.

BRIEF DESCRIPTION OF THE DRAWINGS

Further details, features and advantages of the invention can be found in the drawings as well as in the following description of preferred embodiments with reference to the drawings. The drawings here illustrate merely exemplary embodiments of the invention which do not restrict the essential inventive concept.

FIG. 1c is a schematic illustration of an asymmetrical coil segment according to a preferred embodiment of the present invention.

FIG. 4b is a schematic illustration of a method for manufacturing the coil segment according to a preferred embodiment of the present invention.

Identical parts in the various figures are always provided with the same reference symbols and are therefore as a rule also each mentioned or named only once.

DETAILED DESCRIPTION OF THE INVENTION

Figure 1A:
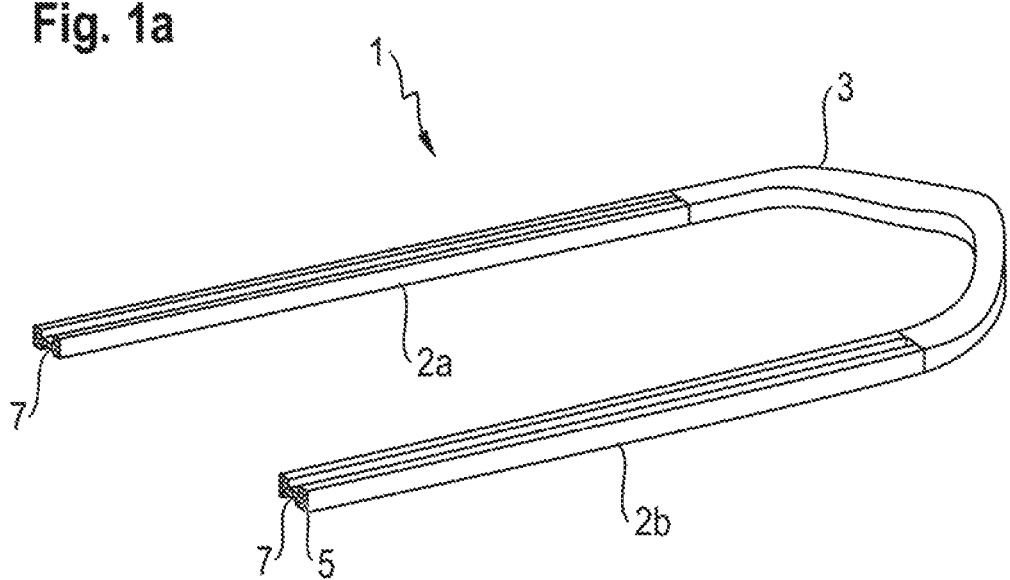
FIG. 1a is a schematic illustration of a coil segment according to a preferred embodiment of the present invention.

In FIG. 1a, a coil segment 1 according to a preferred embodiment of the present invention is illustrated. The coil segment has two end regions 2a, 2b and a central region 3 configured between the end regions. In this context, the central region 3 connects the two end regions 2a, 2b. The coil segment 1 is embodied essentially in a U shape. The end regions 2a, 2b are essentially embodied in a straight fashion and are arranged in an axial direction A in the grooves 8 of the stator core 9. The central region 3 forms a coil end which projects over the stator core 9.

In this context, the two end regions 2a, 2b lie in a plane, the main plane H, and are at a distance d from one another. The central region 3 is embodied in such a way that an installation-space-saving arrangement of the coil segment 1 is possible in the associated stator core 9. In this context, the central region 3 can be shaped differently.

The embodiment of the central region 3 determines here the height by which the central region 3 of the coil segment 1 projects over the stator core 9. In the illustrated embodiment, the central region 3 has at least essentially a curvature with a curvature radius K in the main plane H.

Alternatively, one of the two end regions 3b can be arranged in a plane which is spaced apart from the main plane H and is parallel with respect thereto. The central region 3 then has in each case a further curvature at the junctions between end region 2a, 2b and central region 3.

The coil segment 1 is constructed from a conductor bundle 4. In this context, the conductor bundle 4 has a multiplicity of electrical conductors 5. The electrical conductors 5 are preferably embodied as stranded conductors and each have insulation 6. The insulation 6 advantageously avoids a further current between adjacent electrical conductors 5. Eddy current losses in the winding of the stator coil are minimized by the construction of the coil segment 1 from a multiplicity of electrical conductors.

The electrical conductors 5 can be arranged rotated or unordered with respect to one another in the conductor bundle 4. This advantageously minimizes falling apart of the conductor bundle 4. The electrical conductors 5 can, however, also be arranged coaxially in the conductor bundle 4.

The conductor bundle 4 has here, at least in the end regions 2a, 2b cutouts 7 which run along the end regions 2a, 2b. The cutouts 7 are embodied here in such a way that when two end regions 2a, 2b are arranged facing one another two cutouts 7 come to rest one on top of the other and form a duct 11 for feeding coolant. The cutouts 7 can alternatively also extend over the entire conductor bundle 4.

Figure 1B:
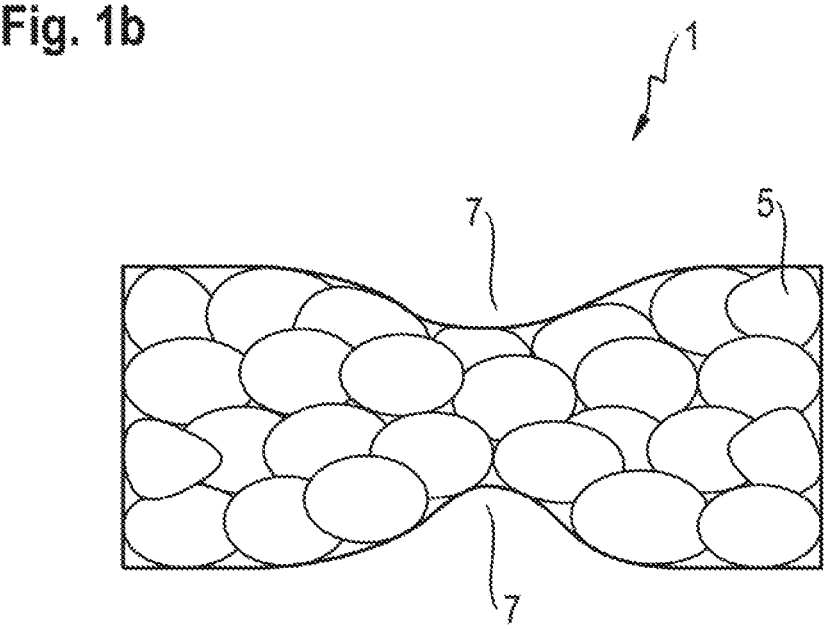
FIG. 1b is a schematic illustration of lie cross section of a coil segment according to a preferred embodiment of the present invention.

FIG. 1b illustrates the cross section through an end region 2a of the coil segment 1 according to a preferred embodiment of the present invention. The cross section of the end region 2a is embodied essentially in a rectangular fashion. The cross section has a cutout 7 on each of two opposite sides. The cutouts 7 are embodied essentially in a U shape. However, any other shape which is suitable for forming a duct 11 for feeding coolant when two end regions 2a, 2b are arranged facing one another is conceivable.

FIG. 1c illustrates an asymmetrical coil segment 1 according to an alternative preferred embodiment of the present invention. The end regions 2a, 2b of the coil segment 1 are embodied with different cross-sectional geometries. By this means, an asymmetrical coil segment 1 is advantageously made available. As a result, it is advantageously possible to adapt the coil segment 1 to the geometry of the stator groove 8. Depending on the electrical machine, the grooves 8 of the stator core 9 can have different geometries. In particular, the grooves 8 can differ through different cross sections. The end regions 2a, 2b are preferably arranged in layers in the grooves. In this context, the first end regions 2a are preferably arranged in a first radially inwardly located layer, and the second end regions 2b are preferably arranged in a second radially outwardly located layer, as is explained below. In the case of non-rectangular groove cross sections, the groove 8 has a first width in the region of the first layer, and a second width, different from the first, in the region of the second layer.

The geometries of the end regions 2a, 2b are advantageously embodied in such a way that the first end region has a cross-sectional width which is adapted to the width of the groove in the region of the first layer, and the second region has a cross-sectional width which is adapted to the width of the groove in the region of the second layer.

Figure 2A:
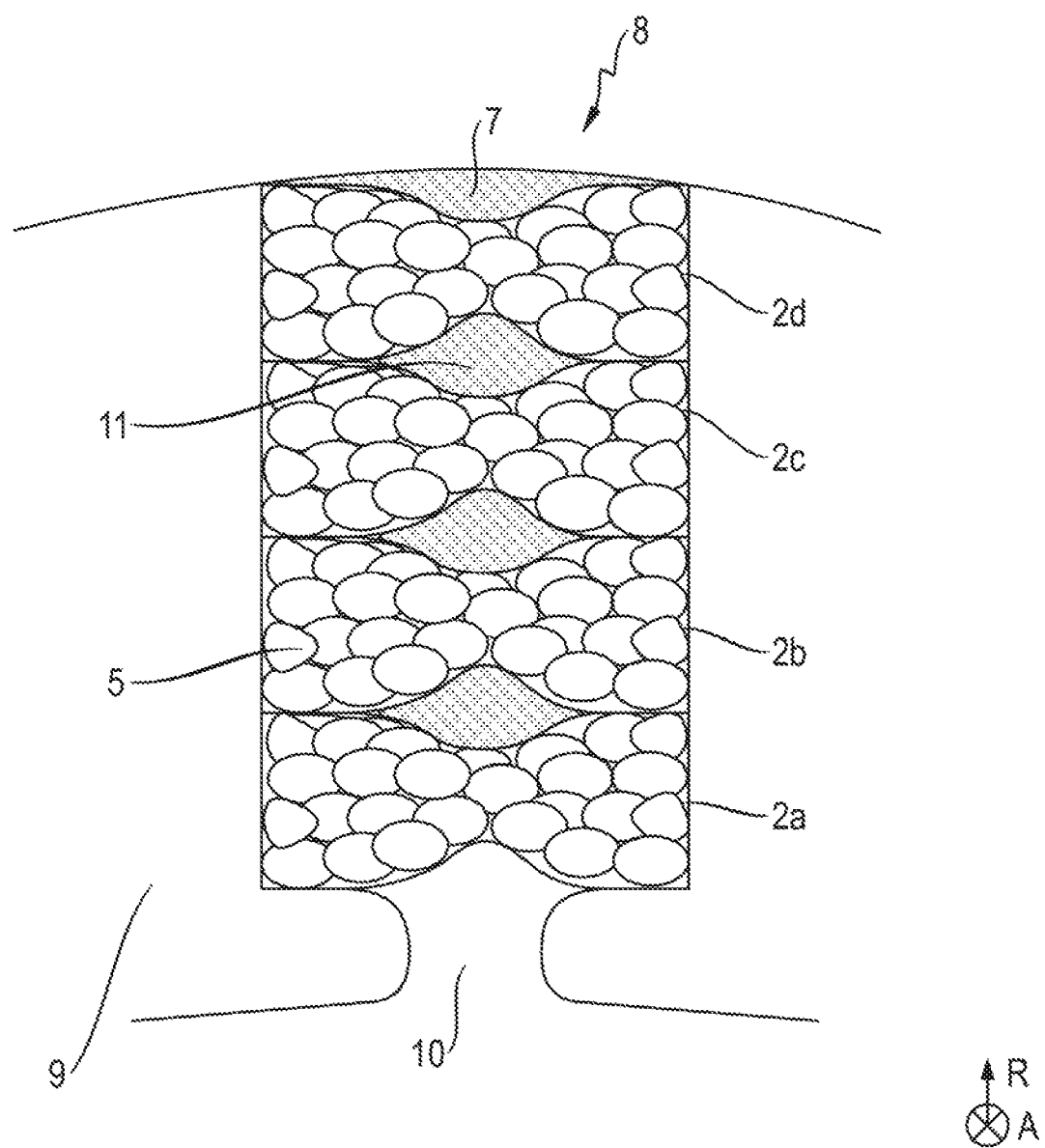
FIG. 2a is a schematic illustration of a stator groove and of coil segments arranged therein according to a preferred embodiment of the present invention.

FIG. 2a illustrates a stator groove 8 and coil segments 1 arranged therein according to a preferred embodiment of the present invention. The stator groove 8 has essentially a rectangular cross section. In this context, a cross section is embodied in an arcuate shape on the radially outer and/or radially inner side. The stator core 9 has an indent 10 which connects the inner side of the stator core 9 to the groove 8. The end regions 2 are arranged in a plurality of layers in the groove. In this context, the end regions 2 preferably also have a rectangular cross section. The electrical conductors 5 of the conductor bundle 4 form here dense conductor layers within the groove 8. This advantageously permits a high filling factor.

The end regions 2 are arranged facing one another in such a way that the cutouts 7 of two end regions come to rest one on top of the other and form a duct 11 for feeding coolant. The duct 11 runs axial direction A here, coaxially with respect to the cylinder axis of the stator core 9. Alternatively, the stator groove 8 can also have a non-rectangular cross section.

Figure 2B:
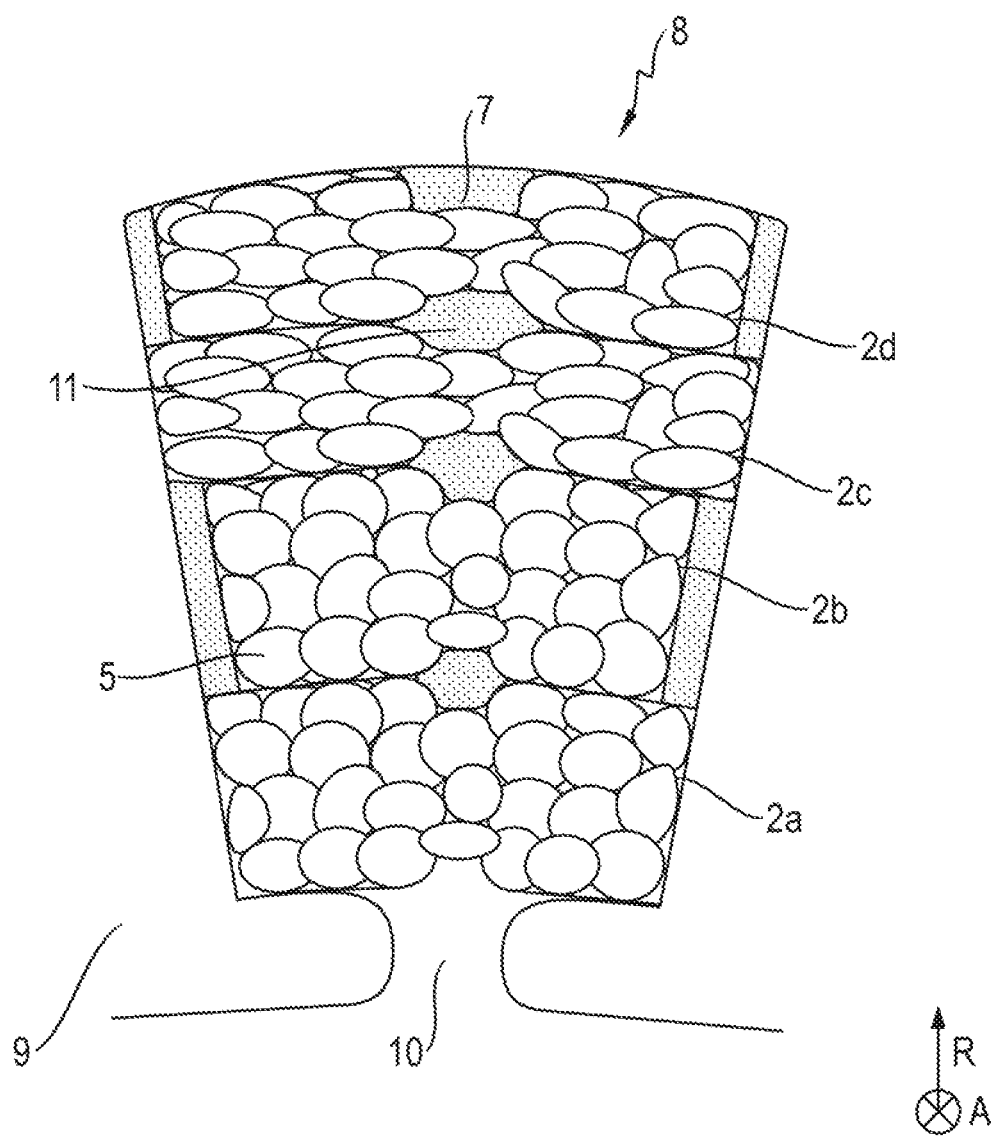
FIG. 2b is a schematic illustration of a stator groove and of segments arranged therein according to an alternative preferred embodiment of the present invention.

FIG. 2b illustrates a stator groove 8 and coil segments 1 arranged therein according to an alternative preferred embodiment of the present invention. The stator groove 8 has an essentially symmetrical, trapezoidal cross section. In this context, the cross section can be embodied in an arcuate shape on the radially outer and/or radially inner side. The stator core 9 has an indent 10 which connects the inner side of the stator core 9 to the groove 8. The stator groove 8 preferably has end regions 2a-2d with a symmetrical, trapezoidal cross section, wherein the widths of the cross sections of at least two end regions 2a and 2b differ from one another. In this context, the widths of the cross sections of all the end regions 2a-2d which are arranged in the groove 8 can be different from one another. The end regions 2a-2d, in accordance with their cross-sectional widths, are preferably arranged in the groove 8 in such a way that a trapezoidal arrangement of the end regions 2a-2d and the most complete filling of the groove 8 with electrical conductors 5 are implemented. As a result, the cross-sectional area of the groove 8 is advantageously filled to an optimum degree by coil segments 1. This advantageously makes available a stator groove 8 with an increased filling factor. Even if a specific embodiment with an arrangement of four layers in a groove 8 is illustrated here, corresponding designs with an arrangement of fewer than or more than four layers in a groove 8 are also conceivable.

The cross sections of the end regions 2a-2d can alternatively be embodied in a rectangular shape, with the result that a step-shaped arrangement of the end regions 2a-2d in the groove 8 is produced. This makes optimum filling of the groove 8 possible.

Figure 2C:
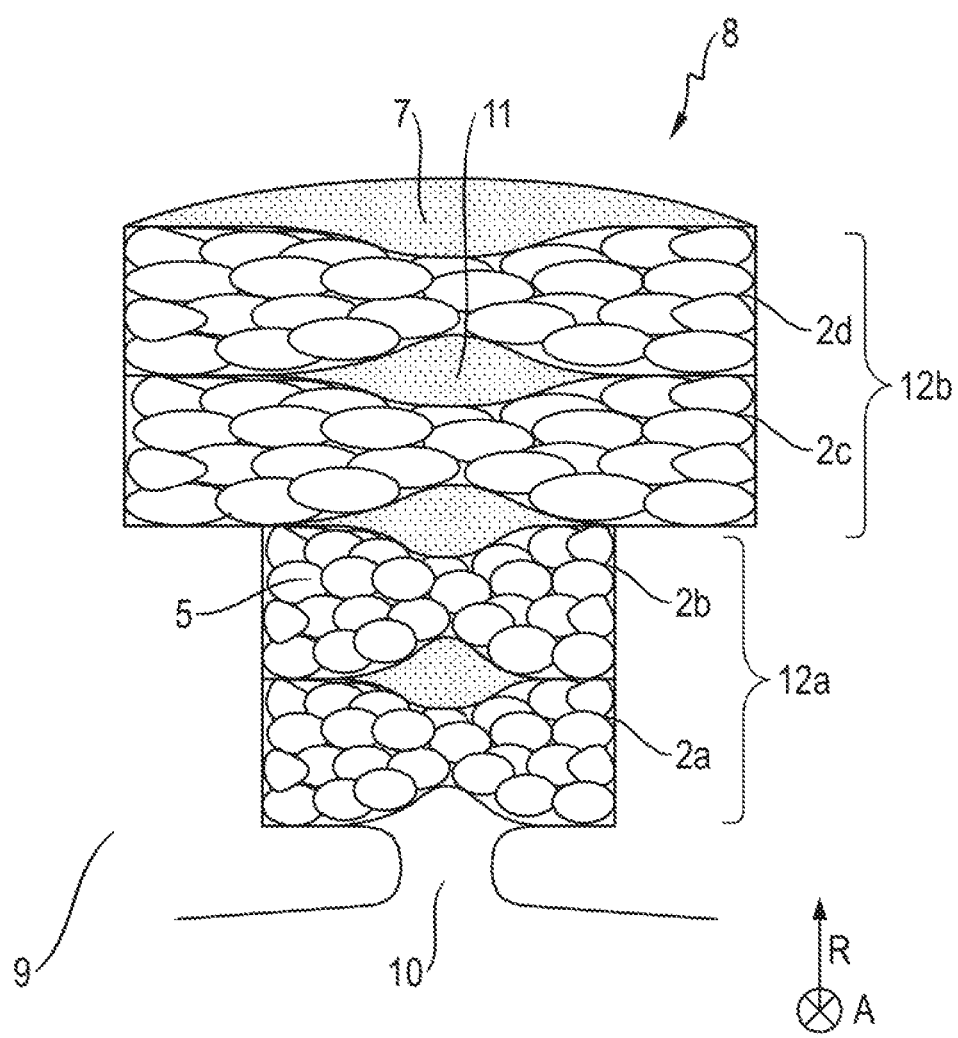
FIG. 2c is a schematic illustration of a stator groove and of coil segments arranged therein according to an alternative preferred embodiment of the present invention.

FIG. 2c illustrates a stator groove 8 and coil segments 1 arranged therein according to an alternative preferred embodiment of the present invention. The stator groove 8 has an essentially T-shaped cross section. That is to say the groove cross section has a region 12a with a first width and a region 12b with a second width. In this context, the cross section can be embodied in an arcuate shape on the radially outer and/or radially inner side. The stator core 9 has an indent 10 which connects the inner side of the stator core 9 to the groove 8. The stator groove 8 preferably has end regions 2a-2d with a rectangular cross section, wherein the widths of the cross sections of the two end regions 2a, 2b and 2c, 2d differ from one another. In this context, the end regions 2a, 2b have a cross section with a width which is matched to the width of the region 12a, and the end regions 2c, 2d have a cross section with a width which is matched to the width of the region 12b. This advantageously permits winding of the stator core 9 with an increased filling factor.

Figure 2D:
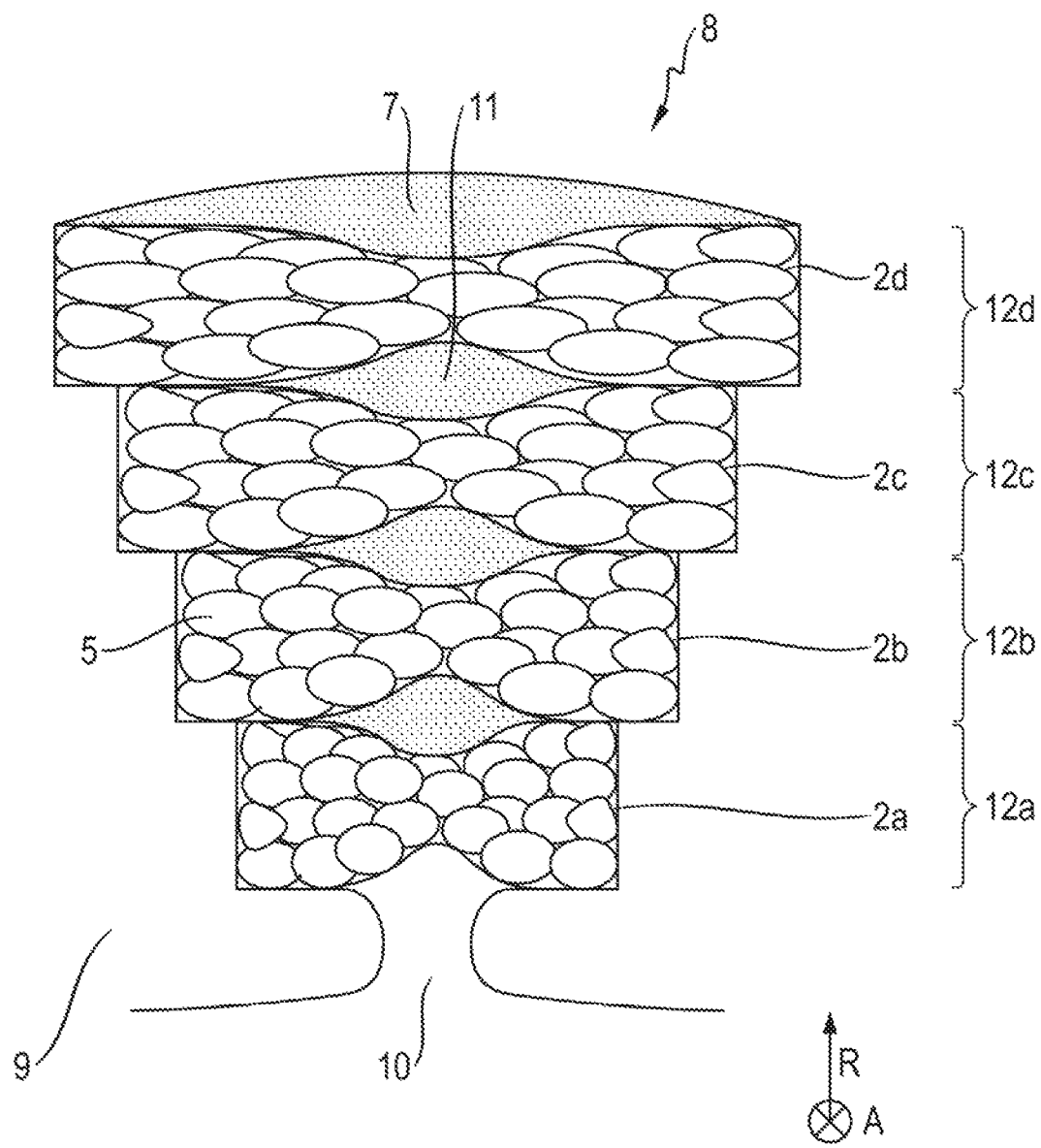
FIG. 2d is a schematic illustration of a stator groove and of coil segments arranged therein according to an alternative, preferred embodiment of the present invention.

FIG. 2d illustrates a stator groove 8 and coil segments 1 arranged therein according to an alternative preferred embodiment of the present invention. The cross section of the stator groove 8 has a step profile essentially on both sides. That is to say the groove cross section has a first region 12a with a first width, a second region 12b with a second width, a third region 12c with a third width and a fourth region 12d with a fourth width. In this context, the cross section can be embodied in an arcuate shape on the radially outer and/or radially inner side. The stator core 9 has an indent 10 which connects the inner side of the stator core 9 to the groove 8. The stator core 8 preferably has end regions 2a-2b with a rectangular cross section, wherein the widths of the cross sections of the end regions 2a-2d each differ from one another. In this context, the end region 2a has a cross section with a width which is matched to the width of the region 12a, the end region 2b has a cross section with a width which is matched to the width of the region 12b, the end region 2c has a cross section with a width which is matched to the width of the region 12c, and the end region 2d has a cross section with a width which is matched to the width of the region 12d. This advantageously permits winding of the stator core 9 with an increased filling factor.

Even if specific embodiments with an arrangement of four layers in a groove 8 are illustrated in FIGS. 2a-2d, corresponding designs with an arrangement of fewer or mare than four layers in a groove 8 are also conceivable.

Figure 3A:
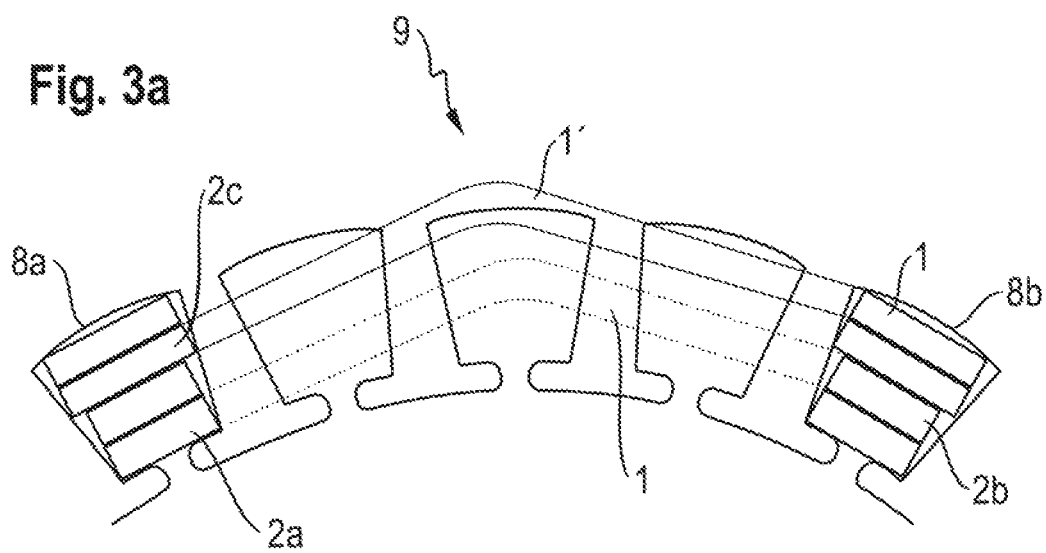
FIG. 3a is a schematic illustration of the winding of a stator core according to a preferred embodiment of the present invention.

FIG. 3a illustrates the winding of a stator core 9 according to a preferred embodiment of the present invention. In this context, the stator core 9 has radially grooves 8 for receiving the coil segments 1. The groove 8 has, for example, an essentially trapezoidal symmetrical cross section. The coil segments 1 are arranged in layers within the grooves 8. The stator has here two different designs of coils 1, 1'. Coil segments 1 according to the first embodiment have end regions 2a, 2b with a first cross-sectional width. Coil segments 1' according to the second embodiment have end regions 2c, 2d with a second cross-sectional width.

In this context, end regions 2a-2d of the coil segments are arranged, in accordance with their cross-sectional width, in layers within the groove 8.

The end regions 2a-2d preferably have a rectangular cross section, wherein the widths of the cross sections of two end regions 2a, 2b and 2c, 2d differ from one another. In this context, the end regions 2a, 2b have a cross section with a width which is matched to the width of the region 12a, and the end regions 2c, 2d have a cross section with a width which is matched to the width of the region 12b.

In this context, the end regions 2a, 2b with the relatively small cross-sectional width are arranged in the two radially inner layers, and the end regions 2c, 2d with the relatively large cross-sectional width are arranged in the two radially outer layers.

The first end region 2a of a coil segment is arranged in the first layer of a first groove 8a, and the second end region 2b of a coil segment is arranged in the second layer of a second groove 8b. In this context, the design of the coil segment determines how many grooves 8 are located between the first and second grooves 8a and 8b. In particular, the radius R of curvature of the central region 3 of the coil segment determines how large the distance is between the first and second grooves 8a and 8b, which distance is spanned by the central region 3.

Figure 3B:
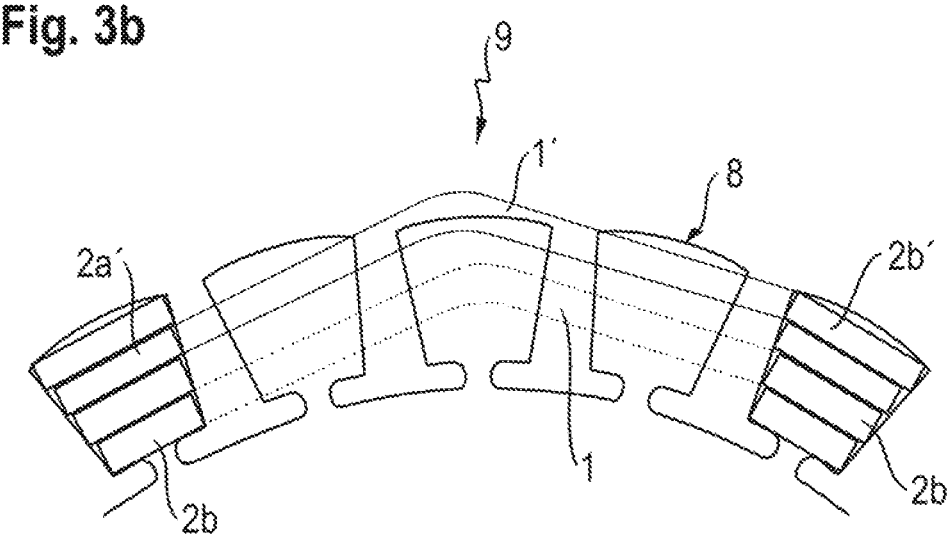
FIG. 3b is a schematic illustration of the winding of a stator core according to an alternative preferred embodiment of the present invention.

FIG. 3b illustrates the winding of a stator core 9 according to one preferred embodiment of the present invention. In this context, the stator core 9 has radially grooves 8 for receiving the coil segments 1. The groove 8 has, for example, an essentially trapezoidal, symmetrical cross section. The coil segments 1 are arranged in layers within the grooves 8. The stator has here four different designs of coil segments 1, 1', . . . . In this context, the coil segments 1, 1' . . . in each design have an end region 2a, 2a', . . . with a first cross-sectional geometry and an end region 2b, 2b', . . . with a second cross section geometry. The coil segments 1, 1', . . . are asymmetrical coil segments according to the present invention. In this context, the end regions 2 of the asymmetrical coil segments 1 are arranged according to their cross-sectional width. The cross-sectional width of the end regions of the asymmetrical coil segments is preferably adapted to the cross section of the groove 8.

Figure 4A:
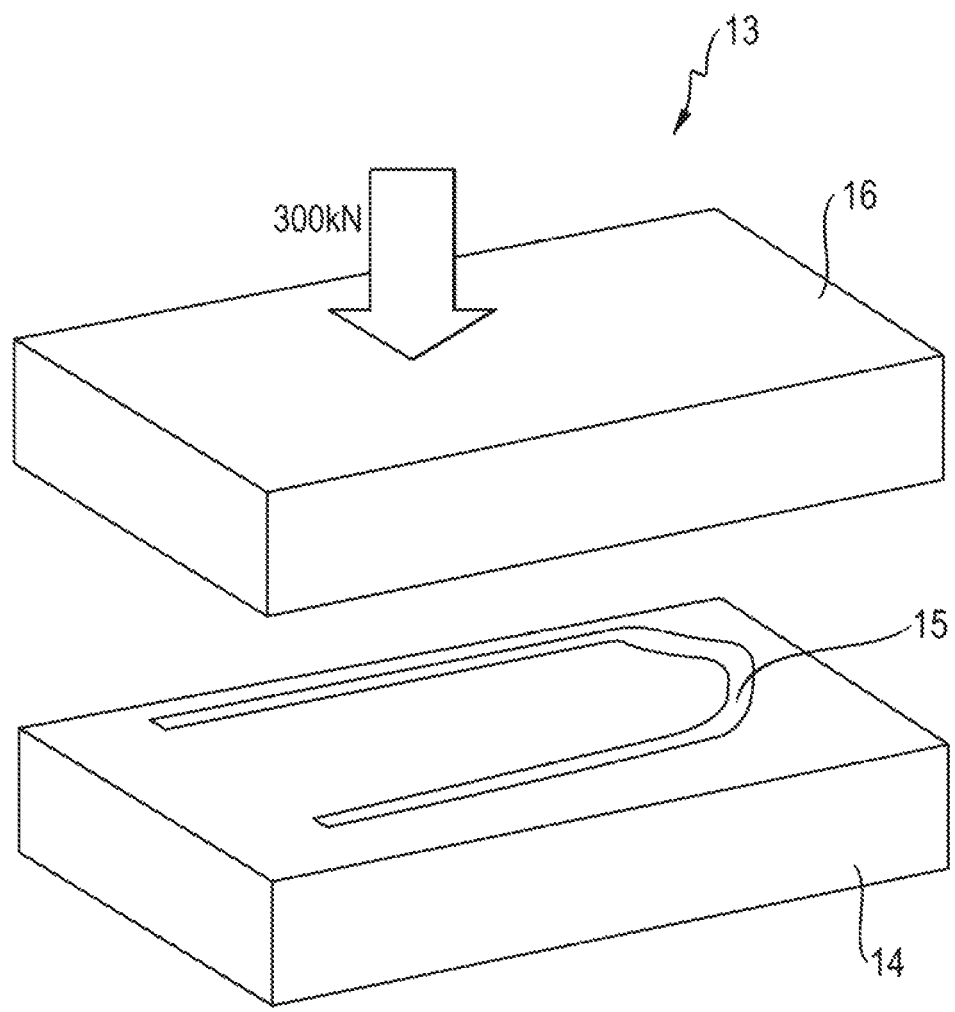
FIG. 4a is a schematic illustration of the a device for manufacturing the coil segment according to a preferred embodiment of the present invention.

FIG. 4a illustrates a compression molding device 13 for compression molding the conductor bundle 4 to form a coil segment 1 according to a preferred embodiment of the present invention. The compression molding device 13 has a mold 14. In this context, the mold 14 has a negative relief 15 in the form of the coil segment 1 to be manufactured. The compression molding device also has a die 16. In this context, the die 16 has a positive relief 17 in the form of a coil segment 1 to be manufactured. In the compression molding step, the conductor bundle 4 is placed in the negative relief 15 of the mold 14 and pressure is applied to it by means of the die 16. In this context, for example a force of 300 kN acts on the conductor bundle 4. As a result, the conductors 5 of the conductor bundle 4 are compressed together. The conductor bundle 4 is compressed into the desired shape. In particular, the positive and the negative reliefs have protrusions. These provide the conductor bundle 4 with cutouts. The conductor bundle 4 can preferably be baked or welded during the compression molding in order to give the conductor bundle 4 increased stability. Alternatively or additionally, the insulation 18 can be arranged around the conductor bundle 4 before it is placed in the mold 14. The insulation 18 can therefore advantageously be connected to the conductor bundle 4 during the compression molding step.

FIG. 4b is a method for manufacturing the coil segment according to a preferred embodiment of the present invention. For this purpose, in a first step a conductor bundle 4 is made available. The conductor bundle 4 has a multiplicity of electrical conductors 5 which are arranged essentially in one direction. In a second step, the conductor bundle 4 is compressed by means of the compression molding device 13. As a result, the electrical conductors 5 are compressed to form a composite. The electrical conductors 5 are compacted in the conductor bundle 4. This preferably permits winding of a stator coil with an increased filling factor.

The conductor bundle 5 has a shape which is predefined by the compression molding device 13. In particular, the conductor bundle 5 has at least one cutout 7 for feeding coolant. The conductor bundle 4 is preferably provided with insulation 18 before the compression molding step. Said insulation 18 is advantageously connected to the conductor bundle 4 in the compression molding step, with the result that the conductor bundle 4 is protected, in particular, from a cooling fluid.

What is claimed is:

1. A stator comprising: (i) a stator core having a multiplicity of grooves, and (ii) a plurality of coil segments each having end segments that are each positioned within one of the grooves, wherein each coil segment comprises a conductor bundle, wherein the conductor bundle has a multiplicity of electrical conductors, wherein the conductor bundle has a form fit, and wherein each end segment of the conductor bundle has at least one recess, and wherein at least two end regions are arranged facing one another in one of the grooves, the at least two end regions directly contact each other, and the recesses of the at least two end regions face each other and together form a cooling duct through which coolant can be fed.

2. The stator as claimed in claim 1, wherein the conductor bundle has insulation.

3. The stator as claimed in claim 1, wherein the conductor bundle has a rectangular cross section in at least one end region.

4. The stator as claimed in claim 1, wherein the conductor bundle has a non-rectangular cross section in at least one end region.

5. The stator as claimed in claim 1, wherein a first end region of the conductor bundle has a first geometry, and wherein a second end region has a second geometry, which is different from the first.

6. The stator as claimed in claim 1, wherein a first end region of the conductor bundle has a first geometry, and wherein a second end region has a second geometry, which corresponds to the first.

7. The stator as claimed in claim 1, wherein the electrical conductors each have insulation.

8. The stator as claimed in claim 1, wherein at least one groove has an end region with a varying width, and wherein at least one end region with a first geometry, and at least one end region with a second geometry are arranged in the at least one groove in such a way that the groove cross section is filled to an optimum degree by the at least two end regions.

9. The stator as claimed in claim 8, wherein the at least one groove has a cross section with a region with a first width and with a region with a second width, which is different from the first width, and wherein at least one first region with a width which corresponds to the first width and at least a second region with a width which corresponds to the second width are arranged in the at least one groove in such a way that the groove cross section is filled to an optimum degree by the at least two end regions.

10. A machine having at least one stator coil as claimed in claim 1.

11. A vehicle having at least one machine as claimed in claim 10.

12. A method for manufacturing a coil segment as claimed in claim 1, wherein in a first step the multiplicity of electrical conductors are combined to form the conductor bundle, and wherein in a second step the conductor bundle is shaped by means of a compression molding method, wherein the conductor bundle has at least one cutout for feeding coolant.

13. The method as claimed in claim 12, wherein the conductor bundle is baked and/or welded during the compression molding method.

14. The method as claimed in claim 12, wherein the conductor bundle is baked and/or welded in a third step after the compression molding method.

15. The method as claimed in claim 12, wherein the conductor bundle is provided with insulation.

16. The method as claimed in claim 12, wherein the two end regions of the conductor bundle are shortened to a specified length.

17. The stator as claimed in claim 1, wherein the cooling ducts are isolated from each other.

18. The stator as claimed in claim 1, wherein the end segments are stacked on top of each other, and the end segments together form a stepped profile.

19. The stator as claimed in claim 1, wherein the end segments are stacked on top of each other, and have different width dimensions.

* * * * *